(12) United States Patent
Martens et al.

(10) Patent No.: US 7,602,694 B2
(45) Date of Patent: Oct. 13, 2009

(54) DUAL-STACK OPTICAL DATA STORAGE MEDIUM AND USE OF SUCH MEDIUM

(75) Inventors: Hubert Cécile François Martens, Eindhoven (NL); Benno Tieke, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 820 days.

(21) Appl. No.: 10/538,332

(22) PCT Filed: Nov. 26, 2003

(86) PCT No.: PCT/IB03/05446

§ 371 (c)(1),
(2), (4) Date: Jun. 10, 2005

(87) PCT Pub. No.: WO2004/055799

PCT Pub. Date: Jul. 1, 2004

(65) Prior Publication Data

US 2006/0114799 A1    Jun. 1, 2006

(30) Foreign Application Priority Data

Dec. 13, 2002  (EP) .................................. 02080285

(51) Int. Cl.
*G11B 7/00* (2006.01)
(52) U.S. Cl. .................... 369/275.1; 369/275.2
(58) Field of Classification Search .................. 369/125, 369/275.1
See application file for complete search history.

(56) References Cited

U.S. PATENT DOCUMENTS

| | | | | |
|---|---|---|---|---|
| 5,633,106 A * | 5/1997 | Aihara et al. | ................. | 430/21 |
| 6,190,750 B1 * | 2/2001 | Wierenga et al. | .......... | 428/64.1 |
| 7,218,603 B2 * | 5/2007 | Woerlee et al. | ............. | 369/283 |
| 7,368,223 B2 * | 5/2008 | Meinders et al. | ....... | 430/270.13 |
| 2001/0046192 A1 * | 11/2001 | Kaneko et al. | ........... | 369/47.27 |
| 2002/0012313 A1 * | 1/2002 | Kimura et al. | ......... | 369/112.08 |
| 2005/0042545 A1 * | 2/2005 | Tieke et al. | ............ | 430/270.11 |

FOREIGN PATENT DOCUMENTS

| | | |
|---|---|---|
| EP | 1143431 A | 10/2001 |
| JP | 11066622 A | 3/1999 |
| WO | WO02099796 A | 12/2002 |

* cited by examiner

*Primary Examiner*—Joseph H Feild
*Assistant Examiner*—Kezhen Shen (57) ABSTRACT

A dual-stack recordable optical data storage medium wherein a focused radiation beam having a wavelength $\lambda$ enters through an entrance face of the medium during recording. The medium includes a substrate, a first recording stack $L_0$, including a recording layer, the first recording stack $L_0$ having an optical reflection value $R_{L0}$ and an optical absorption value $A_{L0}$ at the wavelength $\lambda$, and a second recording stack $L_1$ including a recording layer, the second recording stack $L_1$ having an optical reflection value $R_{L1}$ and an optical absorption value $A_{L1}$ at the wavelength $\lambda$, and a transparent spacer layer between the recording stacks. The second stack is closer to the entrance face than the first stack. By fulfilling the formula $A_{L1} \leq 1 - R_{min} - \sqrt{(R_{min}/R_{L0})}$, where $R_{min}$ is the minimum effective optical reflection value for each recording stack, full compatibility is achieved with a read only version of the medium.

13 Claims, 5 Drawing Sheets

DUAL-STACK OPTICAL DATA STORAGE MEDIUM AND USE OF SUCH MEDIUM

The invention relates to a dual-stack optical data storage medium for recording using a focused radiation beam having a wavelength λ and entering through an entrance face of the medium during recording, comprising:

at least one substrate with present on a side thereof:

a first recording stack named $L_0$, comprising a recordable type $L_0$ recording layer, said first recording stack $L_0$ having an optical reflection value $R_{L0}$ and an optical absorption value $A_{L0}$ at the wavelength λ, a second recording stack named $L_1$ comprising a recordable type $L_1$ recording layer, said second recording stack $L_1$ having an optical reflection value $R_{L1}$ and an optical absorption value $A_{L1}$ at the wavelength λ, said second recording stack being present closer to the entrance face than the first recording stack, a transparent spacer layer sandwiched between the recording stacks, said transparent spacer layer having a thickness substantially larger than the depth of focus of the focused radiation beam.

The invention also relates to the use of such a medium.

An embodiment of an optical recording medium as described in the opening paragraph is known from Japanese Patent Application JP-11066622.

Regarding the market for optical recording, it is clear that the most important and successful format so far is a write-once format, Compact Disk Recordable (CD-R). Although the take-over in importance by Compact Disk ReWritable (CD-RW) has been predicted since a long time, the actual market size of CD-R media is still at least an order of magnitude larger than for CD-RW. Furthermore the most important parameter for drives is the maximum write speed for R-media, not for RW. Of course, a possible shift of the market to CD-RW is still possible, e.g. because of Mount Rainier standardization for CD-RW. However, the R-format has been proven very attractive due to its 100% compatibility with read only compact disk (CD).

Recently the Digital Versatile Disk (DVD) has gained market share as a medium with a much higher data storage capacity than the CD. Presently, this format is available in a read only (ROM) and a rewritable RW) version. Next to the DVD ReWritable (DVD+RW) standard a new recordable (R), i.e. write once, DVD+R standard was developed. The new DVD+R standard gets increasing attention as an important support for DVD+RW. A possible scenario is that the end customers have become so familiar with an optical write-once format that they might accept it more easily than a re-writable format. Recently a new format has been introduced called Blu-ray Disc (BD) with even a higher storage capacity. For this format also R and RW versions will be introduced.

An issue for both the R and RW formats is the limited capacity and therefore recording time because only single-stacked media are present. Note that for DVD-Video, which is a ROM disk, dual layer media already have a considerable market share. A dual-layer, i.e. dual-stack, DVD+RW disk is probably feasible. However, it has become clear that a fully compatible disk, i.e. within the reflection and modulation specification of the dual-layer DVD-ROM, is very difficult to achieve and requires at least a major breakthrough for the properties of the amorphous/crystalline phase-change materials, which are used as recording layers in e.g. DVD+RW media. Without a full compatibility, the success of a dual-layer DVD+RW in the market is questionable.

In order to obtain e.g. a dual-stack DVD+R medium which is compatible with the dual-layer (=stack) DVD-ROM standard, the effective reflectivity of both the upper $L_1$ layer and the lower $L_0$ layer should be at least 18%. More generally it can be said that any new generation dual stack medium requires a minimum effective optical reflection level $R_{min}$ in order to meet a specification, e.g. for a dual stack BD the expected value of $R_{min}$ is 0.04 and for a dual stack BD compatible with a single stack BD $R_{min}$=0.12. Effective optical reflection means that the reflection is measured as the portion of effective light coming back from the medium when e.g. both stacks $L_0$ and $L_1$ are present and focusing on $L_0$ and $L_1$ respectively. The conditions, which must be imposed on the optical reflection, absorption and transmission values of the stacks in order to meet such a specification are by far not trivial. In JP-11066622 nothing is mentioned about requirements with respect to optical reflection, absorption and transmission values of the stacks. It should be noted that in this document the normally used convention of notation of $L_0$ and $L_1$, in which notation $L_0$ is the "closest" stack, i.e. closest to the radiation beam entrance face, has been changed: $L_0$ now is the deepest stack, as seen from the radiation beam entrance face, and $L_1$ is the stack closer to the radiation beam entrance face.

It is an object of the invention to provide an optical data storage medium of the type mentioned in the opening paragraph which has an effective optical reflection level of both the $L_0$ stack and the $L_1$ of more than a specified value $R_{min}$.

This object has been achieved in accordance with the invention by an optical storage medium, which is characterized in that $A_{L1} \leq 1 - R_{min} - \sqrt{(R_{min}/R_{L0})}$ in which formula $R_{min}$ is the minimum required optical effective reflection value for each recording stack. For a given optical data storage medium, the effective reflection of both recording stacks of a dual-stack disc, should always lie above a specified minimum reflection $R_{min}$. This implies that the effective reflection of $L_1$ should meet the following criterion:

$$R_{L1eff} = R_{L1} \geq R_{min} \qquad \text{Eq(1)}$$

For $L_0$, the effective reflection should be $$R_{L0eff} = R_{L0} * T_{L1}^2 \geq R_{min} \qquad \text{Eq(2)}$$

Thus, we obtain a requirement for the transmission of $L_1$ of $$T_{L1} \geq \sqrt{(R_{min}/R_{L0})} \qquad \text{Eq(3)}$$

Equations (1) and (3) show that the optical properties of the total dual-stack medium are mainly defined by the optical properties of $L_1$. The combination of equations (1) and (3) directly defines a requirement for the allowable absorption of $L_1$:

$$A_{L1} \leq 1 - R_{min} - \sqrt{(R_{min}/R_{L0})} \qquad \text{Eq(4)}$$

The maximum $A_{L1}$ that is ever allowable is obtained for maximum reflection of $L_0$, i.e. when $R_{L0}=1$. In this case, also the highest possible effective reflection from $L_0$ is obtained. Thus we can define a maximum for the absorption in $L_1$ that is still allowed as follows:

$$A_{L1max} = 1 - R_{min} - \sqrt{(R_{min})} \qquad \text{Eq(5)}$$

The choice $R_{L0}=1$ implies that it is impossible to write data into $L_0$ since no absorption of optical radiation occurs. This extreme situation would e.g. be applicable to a dual-stack recordable-ROM disc or recordable $L_1$, ROM $L_0$ disc.

In an embodiment $A_{L1} \leq A_{L0}$. In order to be able to record information via optical means in $L_0$, the $L_0$ stack should have a finite optical absorption at the wavelength of the radiation beam, e.g. a laser. Since only part of the light of the recording laser is transmitted through $L_1$, $L_0$ should preferably be made more sensitive, i.e. have a higher absorption than $L_1$, in order to keep the required write-power within acceptable limits. For a recordable dual-layer disc it seems natural to impose the following two conditions: (i) same effective reflection of both layers (same signal amplitudes which is preferred from drive point-of-view) and (ii) same effective absorption in both layers (same write-powers needed irrespective of layer). These two boundary conditions give rise to a preferred absorption in $L_1$ that is given by:

$$A_{1pref} = 1 - 3R_{min}/4 - 1/4 - 1/4 \cdot [(1-R_{min})^2 + 8R_{min}]^{1/2} \quad \text{Eq}(6)$$

Then, the preferred absorption in $L_0$ (assuming $T_{L0}=0$) is given by $$A_{0pref} = 1 - R_{min}/\{1/4 - R_{min}/4 + 1/4 \cdot [(1-R_{min})^2 + 8R_{min}]^{1/2}\}^2 \quad \text{Eq}(7)$$

Figure 5:
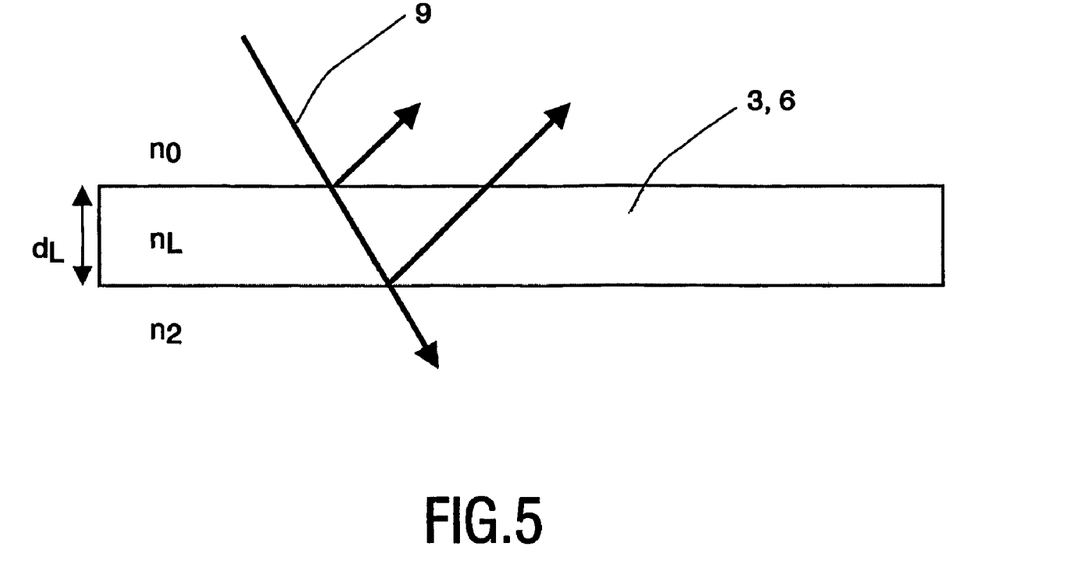
FIG. 5 shows a schematic layout of the absorption of an optical radiation beam by an absorbing recording layer, neglecting interference effects within the recording layer.

The next step is to recognize that the absorption in $L_0$ and $L_1$ is mainly determined by the thickness of the recording layer $d_L$ in $L_0$ and $L_1$ respectively and the absorption coefficient $k_{L\lambda}$ of the recording layer material in $L_0$ and $L_1$ respectively ($k_{L\lambda}$ is the imaginary part of the complex refractive index $n_{L\lambda}$). To estimate the absorption within the recording stack the effect of a possible dual-layer stack design is omitted, which implies the following simplifications: (i) interference effects within the recording layer are neglected, (ii) possible absorption in additional layers that may be present is neglected, (iii) recording layer is embedded in between two semi-infinite media having complex refractive index n0 and n2, see FIG. 5. Typically the upper surrounding medium will be transparent (substrate for $L_1$ and spacer for $L_0$) while the lower medium will be either transparent (spacer for $L_1$) or highly reflecting (mirror for $L_0$). Then, the absorption of optical power within this layer depends exponentially on both $d_L$ and $k_L$ and is calculated to be:

$$A = \left[1 - \exp\left[\frac{-4\pi d_L k_L}{\lambda}\left[1 + \left(\left|\frac{n_L - n_2}{n_L + n_2}\right|\right)\right]\right]\right] \cdot \left[1 - \left(\left|\frac{n_0 - n_L}{n_0 + n_L}\right|\right)^2\right] \quad \text{Eq}(8)$$

$\lambda$ is the wavelength of the laser. The term $(1+|(n_L-n_2)/(n_L+n_2)|)$ in the exponent is a measure for the effective thickness increase due to the portion of light that is reflected back at the second interface of the recording layer, see FIG. 5. The multiplication-factor $(1-|(n_L-n_0)/(n_L+n_0)|^2)$ accounts for the light that is reflected at the first interface. Typically, the $L_1$ stack will be tuned for both finite reflection and transmission. Then, the most dominant contribution to the stack's absorption will be the absorption for a single-pass of light. The $L_0$ stack will be tuned for high reflection, and the stack's absorption will be close that for a double-pass of light.

Figure 4:
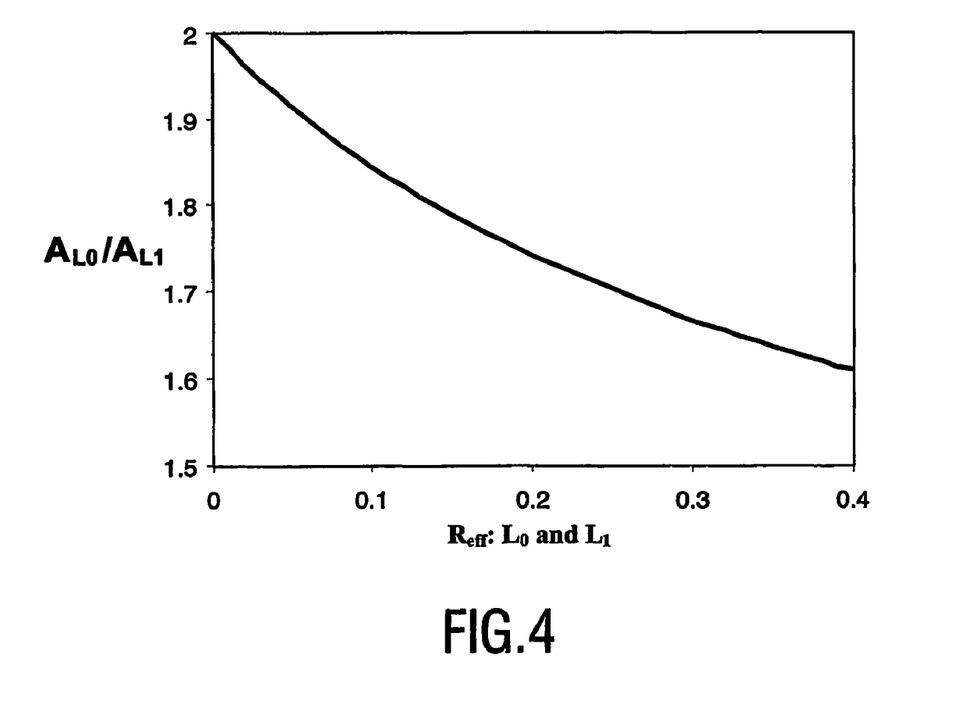
FIG. 4 shows the ratio between optical absorption in $L_0$ and $L_1$ as a function of effective reflection.

Preferably $1.5 A_{L1} \leq A_{L0} \leq 2.5 A_{L1}$. From FIG. 4 it can be seen that for equal write-power in $L_0$ and $L_1$, the absorption in $L_0$ should typically be approximately twice that of $L_1$. For the range of most interest, i.e. finite absorption to achieve high T in $L_1$ and high R in $L_0$, the double pass will yield approximately twice as much absorption. Thus, in order to have the absorption of both layers in the required range, the following is valid for both layers:

$$0.5 * A_{L0max} \approx A_{L1max} = 1 - R_{min} - \sqrt{(R_{min})} \leq 1 - \exp(-4\pi k_L d_L/\lambda) \quad \text{Eq}(9)$$

Figure 6:
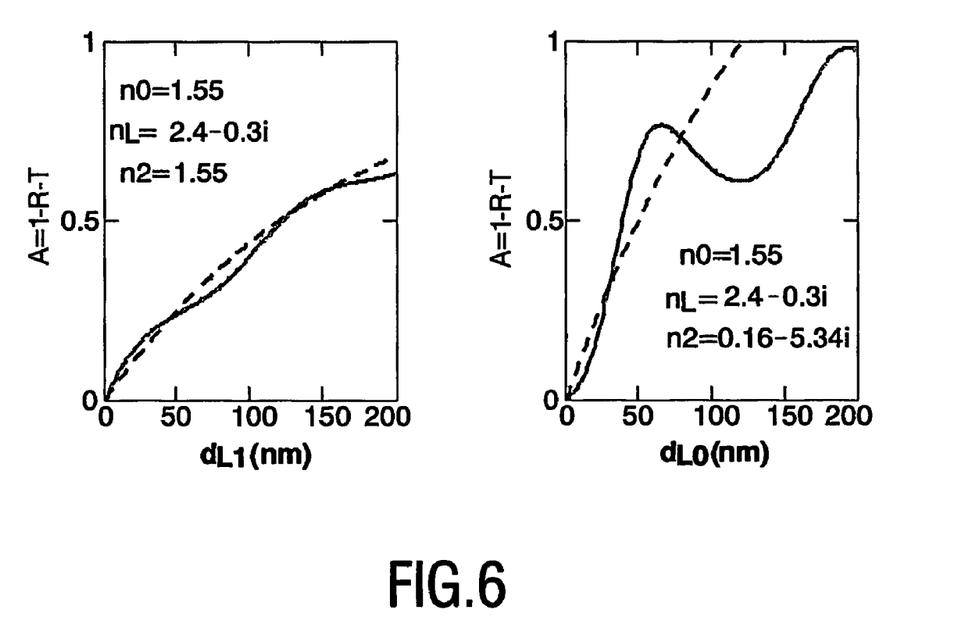
FIG. 6 shows a comparison between calculated absorption and approximation of Eq (9) for $L_1$ type of stack (left) and $L_0$ type of stack (right). Solid line: exact calculation; dashed line: approximation.

From FIG. 6 it can be seen that this approximation is best for the $L_1$ type stacks, where of course interference effects play a less important role.

One effect that is not taken into account in the above calculations is the presence of the guide grooves in the medium, which are normally present for tracking purposes in each recording stack adjacent the recording layer. Due to these grooves, the radiation beam is diffracted and only a part (or none) of the diffracted light is captured by the reflection/transmission measurement setup. Thus the diffraction appears like a kind of absorption. The diffraction is used to generate tracking signals like push-pull and track-cross and preferably these signals are of equal magnitude on both stacks to minimize adjustments to the servo-systems when switching between the stacks. This in turn means that for both layers a similar amount of light is lost in the reflection/transmission measurement. It means that the indicated ranges of absorption and k/d range are really the upper-limit that is allowed since the range is derived assuming no diffraction losses at all.

In an embodiment, for the recordable type $L_1$ recording layer having a complex refractive index $\tilde{n}_{L1\lambda} = n_{L1\lambda} - i*k_{L1\lambda}$ at the wavelength $\lambda$ and having a thickness $d_{L1}$, the following formula is fulfilled:

$$k_{L1\lambda} \leq \{\lambda * \ln[1/(R_{min} + \sqrt{(R_{min})})]\}/(4\pi * d_{L1})$$

in which formula $k_{L1\lambda}$ is the absorption coefficient of the $L_1$ recording layer.

In a further embodiment, for the recordable type $L_0$ recording layer having a complex refractive index $\tilde{n}_{L0\lambda} = n_{L0\lambda} - i*k_{L0\lambda}$ at the wavelength $\lambda$ and having a thickness $d_{L0}$, the following formula is fulfilled:

$$k_{L0\lambda} \leq \{\lambda * \ln[1/(R_{min} + \sqrt{(R_{min})})]\}/(4\pi * d_{L0})$$

in which formula $k_{L0\lambda}$ is the absorption coefficient of the $L_0$ recording layer.

It is noted that the above analysis is more accurate for low k-values k<1); for k>1 the presented formula becomes inaccurate although it still can serve as a rough estimate. Further it should be noted that the definition of the thickness $d_{L0}$ and $d_{L1}$ of the recording layers requires some further explanation. It may e.g. be that the recording layer thickness in a guide groove is different from the thickness in between guide grooves due to leveling effects during the application of the recording layer by e.g. spincoating. Hence the thickness of the recording layer is defined as being the thickness where the focused radiation beam spot is present during recording and read out.

To obtain a recordable dual-stack optical data storage medium that meets the specifications of the dual-layer (stack) DVD-ROM disc, it is required that $\lambda$ is about 655 nm, $R_{min}=0.18$ and that $k_{L0\lambda}$ and $k_{L1\lambda}$ fulfil the requirements of equations Eq(9) and Eq(10).

To obtain a recordable dual-stack optical data storage medium that meets the (expected) specifications of the dual-stack Blu-ray Disc (BD), it is required that $\lambda$ is about 405 nm, $R_{min}=0.04$ and that $k_{L0\lambda}$ and $k_{L1\lambda}$ fulfil the requirements of equations Eq(9) and Eq(10).

For a dual-stack Blu-ray Disc which is compatible with the single layer reflection specification, it is required that $\lambda$ is about 405 nm, $R_{min}=0.12$ and that $k_{L0\lambda}$ and $k_{L1\lambda}$ fulfil the requirements of equations Eq(9) and Eq(10). Preferably $0.7 * d_{L0} < d_{L1} < 1.3 * d_{L0}$ for the media described the last three paragraphs.

It should be noted that the invention is not limited to a single sided dual stack medium but that by varying substrate thicknesses e.g. two single sided dual stack media according to the invention may be bonded together forming a dual sided dual stack medium, which fulfils thickness requirements.

The invention will be elucidated in greater detail with reference to the accompanying drawings, in which.

Figure 1:
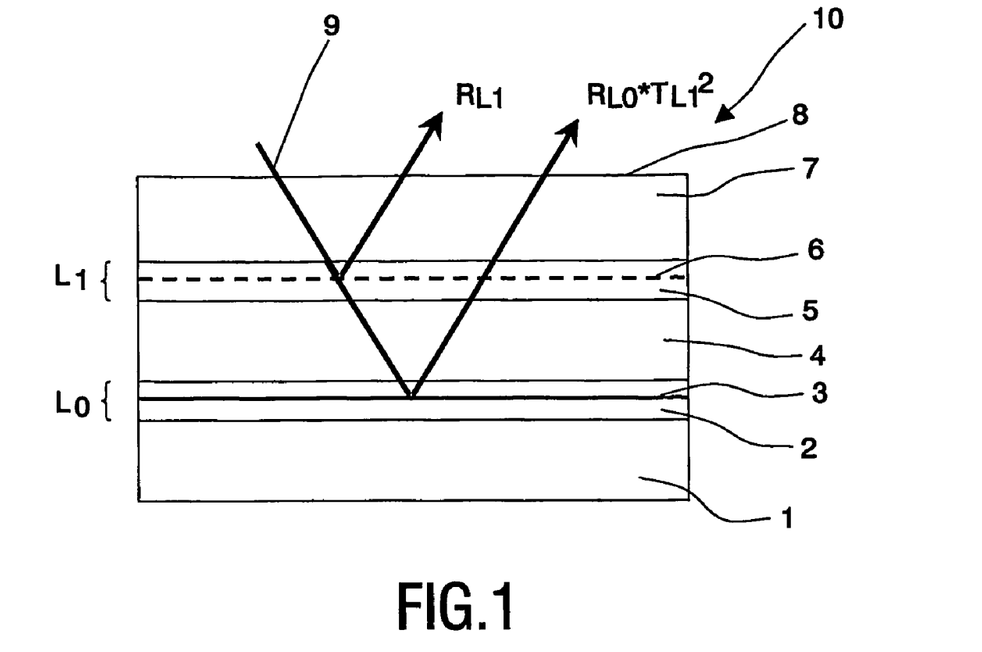
FIG. 1 shows a schematic layout of a dual-stack optical data storage medium according to the invention. The effective reflection of both stacks is indicated.

In FIG. 1 a dual-stack optical data storage medium 10 for recording using a focused radiation beam, e.g. a laser beam 9, having a wavelength λ is shown. The laser beam enters through an entrance face 8 of the medium 10 during recording. The medium 10 comprises substrates 1 and 7 with present on a side thereof a first recording stack 2 named $L_0$, having an optical reflection value $R_{L0}$ and an optical absorption value $A_{L0}$ at the wavelength λ and a second recording stack 5 named $L_1$ having an optical reflection value $R_{L1}$ and an optical absorption value $A_{L1}$ at the wavelength λ, a transparent spacer layer 4 is sandwiched between the recording stacks 2 and 5, said transparent spacer layer 4 having a thickness of 50 μm which is substantially larger than the depth of focus of the focused laser beam 9. The absorption value fulfils the following equation:

$$A_{L1} \leq 1 - R_{min} - \sqrt{(R_{min}/R_{L0})}$$

in which formula $R_{min}$ is the minimum required effective optical reflection value for each recording stack.

The first recording stack 2, comprises a recordable type $L_0$ recording layer 3, e.g. an azo dye or any other suitable dye. A guide groove is present in the first substrate 1 or in the spacer layer 4, a first highly reflective layer is present between the $L_0$ recording layer 3 and the substrate 1. A second substrate 7 is present with on a side thereof a second recording stack 5 comprising a recordable type $L_1$ recording layer 6, e.g. an azo dye or any other suitable dye. The second $L_1$ recording stack 5 is present at a position closer to the entrance face 8 than the $L_0$ recording stack 2. A second guide groove is present in the second substrate 7 or in the spacer layer 4. The first substrate 1 with $L_0$ is attached to the substrate with $L_1$ by means of the transparent spacer layer 4, which may act as bonding layer. Specific suitable $L_0/L_1$ stacks designs are described below.

Embodiment 1 DVD Recordable Dual Stack
$R_{min}$=0.18, λ=655 nm, (Layers in this Order):

Substrate 1 made of PC having a thickness of 0.60 mm
Reflective layer of 100 nm Ag (n=0.16-5.34i), Au, Cu or Al, or alloys thereof, may be used as well,
$L_0$ recording layer 3 of an azo dye, with thickness of 80 nm, the refractive index of the dye at a radiation beam wavelength of 655 nm is 2.24-0.02i.
First semitransparent reflective layer made of Ag having a thickness of 10 nm, Au, Cu or Al, or alloys may be used as well,
Spacer layer 4 made of a transparent UV curable resin having having a thickness of 50 μm,
Second semitransparent reflective layer made of Ag having a thickness of 10 nm, Au, Cu or Al, or alloys may be used as well,
$L_1$ recording layer 6 of an azo dye, with thickness of 80 nm, the refractive index of the dye at a radiation beam wavelength of 655 nm is 2.24-0.02i.
Substrate 7 made of PC having a thickness of 0.58 mm This stack design has the following reflection, absorption and transmission values:

$A_{L0}$=0.4
$A_{L1}$=0.2
$R_{L0}$=0.6
$R_{L1}$=0.2
$T_{L1}$=0.6
$T_{L0}$=0

The formula $A_{L1} \leq 1 - R_{min} - \sqrt{(R_{min}/R_{L0})} = 1 - 0.18 - \sqrt{(0.18/0.6)} = 0.27$ has been fulfilled. Furthermore $k_{L0\lambda}*d_{L0}=1.6$ nm $\leq \{\lambda*\ln[1/(R_{min}+\sqrt{(R_{min})})]\}/(4\pi)=26.4$ nm and $k_{L1\lambda}*d_{L1}=1.6$ nm $\leq \{\lambda*\ln[1/(R_{min}+\sqrt{(R_{min})})]\}/(4\pi)=26.4$ nm.

The first semitransparent reflective layer may also be a $SiO_2$ layer with a thickness of e.g. 20 nm; other dielectrics may be used as well. In a different embodiment the first semitransparent reflective layer may be absent. Furthermore, additional dielectric layers may be present between the recording layer and the reflective and/or semitransparent reflective layers. The second semitransparent may also be a dielectric (e.g. SiO2) or semiconducting (e.g. Si) layer. Furthermore, additional dielectric layers may be present between the recording layer and the second semitransparent reflective layer and/or between second semitransparent reflective layer and the spacer layer and/or between the recording layer and the substrate 7.

Embodiment 2 BD Recordable Dual Stack
$R_{min}$=0.12, λ=405 nm (Layers in this Order):

Substrate 1 made of PC having a thickness of 1.1 mm
Reflective layer of 100 nm Ag (n=0.17-2i), Au, Cu or Al, may be used as well,
$L_0$ recording layer 3 of an organic dye, with thickness of 50 nm, the refractive index of the dye at a radiation beam wavelength of 405 nm is 2.4-0.04i.
First transparent dielectric layer made of SiO2 having a thickness of 20 nm, other dielectrics (Si3N4, ZnS—SiO2, Al2O3, AlN) may be used as well,
Spacer layer 4 made of a transparent UV curable resin having a thickness of 25 μm, $L_1$ recording layer 6 of an organic dye, with thickness of 50 nm, the refractive index of the dye at a radiation beam wavelength of 405 nm is 2.4-0.04i.

Second transparent dielectric layer made of $SiO_2$ having a thickness of 20 nm, other dielectrics ($Si_3N_4$, ZnS—$SiO_2$, $Al_2O_3$, AlN) may be used as well.

Substrate 7, in this embodiment also called cover layer, made of a transparent UV curable resin, having a thickness of 0.075 mm.

This stack design has the following reflection, absorption and transmission values:

$A_{L0}$=0.6
$A_{L1}$=0.2
$R_{L0}$=0.4
$R_{L1}$=0.2
$T_{L1}$=0.6
$T_{L0}$=0

Figure 2:
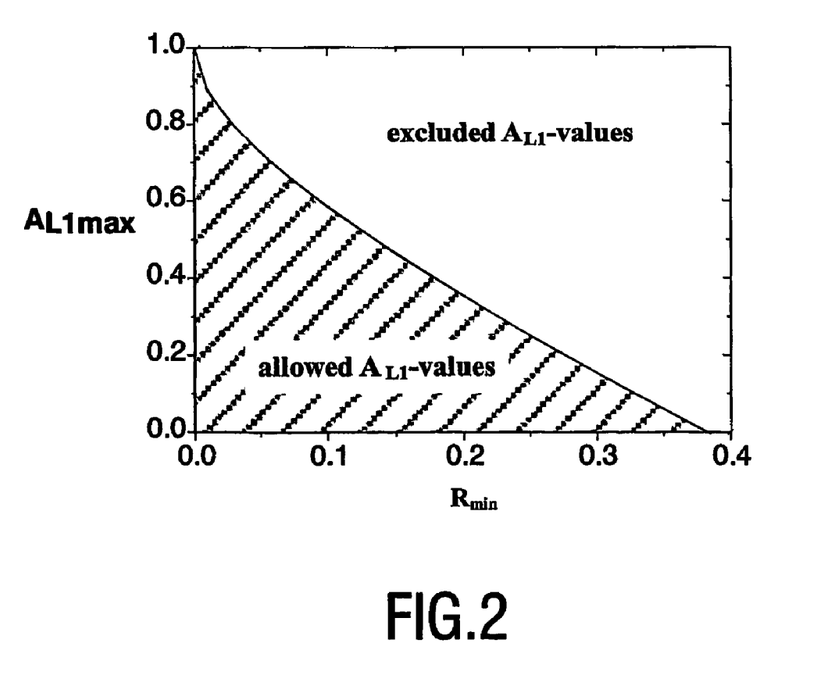
FIG. 2 shows the maximally allowable absorption in $L_1$ as a function of the imposed minimum effective reflectivity of both layers of the dual-stack disc.

The formula $A_{L1} \leq 1-R_{min}-\sqrt{(R_{min}/R_{L0})}=1-0.12-\sqrt{(0.12/0.4)}=0.33$ has been fulfilled. Furthermore $k_{L0\lambda}*d_{L0}=2$ nm$\leq\{\lambda*\ln[1/(R_{min}+\sqrt{(R_{min})})]\}/(4\pi)=24$ nm and $k_{L1\lambda}*d_{L1}=2$ nm$\leq\{\lambda*\ln[1/(R_{min}+\sqrt{(R_{min})})]\}/(4\pi)=24$ nm In FIG. 2 a graph is drawn representing the maximum allowable absorption in $L_1$ $A_{L1max}$ as a function of a minimum effective reflection $R_{min}$ of both recording stacks $L_0$ and $L_1$. Note that the maximum achievable value of $R_{min}$ is about 0.38. This value represents the case in which the $L_1$ stack does not have absorbance anymore and hence recording is not possible, while also the $L_0$ stack has no absorption and maximum reflection ($R_{L0}$=1).

Figure 3:
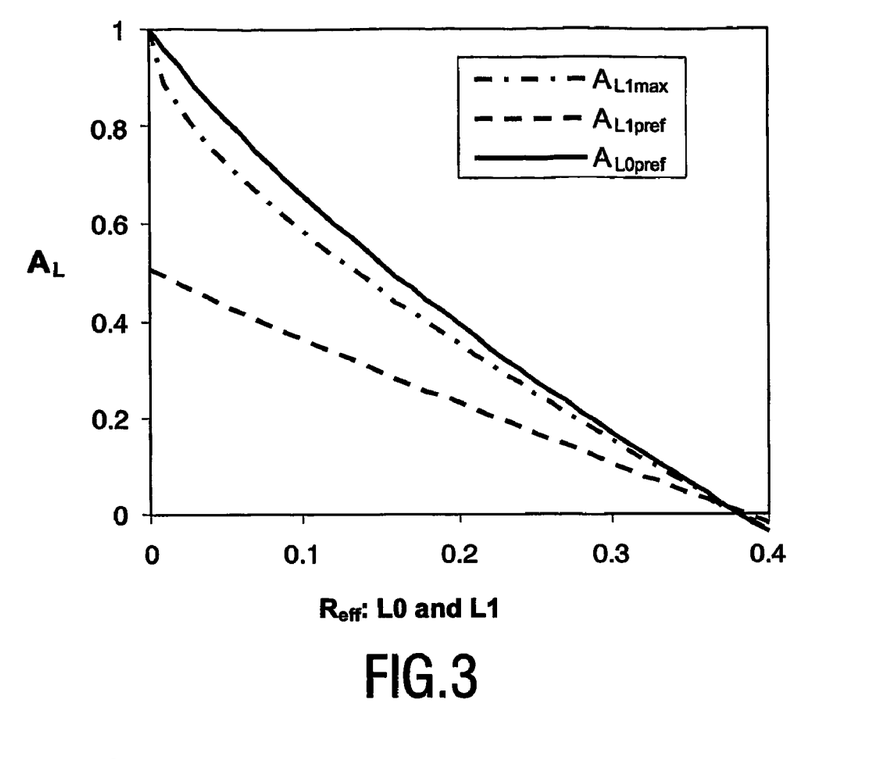
FIG. 3 shows the preferred absorption in $L_0$ and $L_1$ compared to maximally allowable absorption in $L_1$ as a function of the effective reflectivity of $L_0$ and $L_1$.

In FIG. 3 the preferred absorption in $L_0$ and $L_1$ are compared to the maximally allowable absorption in $L_1$ as a function of the effective reflectivity of $L_0$ and $L_1$. This preferred absorption graphs are representations of equations (6) and (7).

In FIG. 4 the ratio between $A_{L0}$ and $A_{L1}$ is shown as a function of the effective reflectivity of $L_0$ and $L_1$. It can be seen that preferably this ratio is in the range 1.5-2.5 more preferably in the range 1.5-2.0.

In FIG. 5 a schematic layout of a recording layer 3, 6 in a dual stack optical data storage medium 10 is shown (see FIG. 1). The path of an optical radiation beam is show. The absorption in $L_0$ and $L_1$ is mainly determined by the thickness of the recording layer $d_L$ and the absorption coefficient $k_{L\lambda}$ of the recording layer material ($k_{L\lambda}$ is the imaginary part of the complex refractive index $n_{L\lambda}$). To estimate the absorption within the recording stack the detailed effect of a possible dual-layer stack design is omitted, which implies the following simplifications: (i) interference effects within the recording layer are neglected, (ii) possible absorption in additional layers that may be present is neglected, (iii) recording layer is embedded in between two semi-infinite media having complex refractive index n0 and n2. Typically, the upper surrounding medium will be transparent (substrate for $L_1$ and spacer for $L_0$) while the lower medium will be either transparent (spacer for $L_1$) or highly reflecting (mirror for $L_0$). Then, the absorption of the optical radiation beam within this layer depends exponentially on both $d_L$ and $k_L$, represented by equation (8).

In FIG. 6 modeling results are presented of the absorption as a function of the recording layer thickness. The solid line indicates the exact calculation while the dashed line is the approximation of equation (9). Notice that the approximation is best for the $L_1$ stack and reasonable for the $L_0$ stack.

Figure 7:
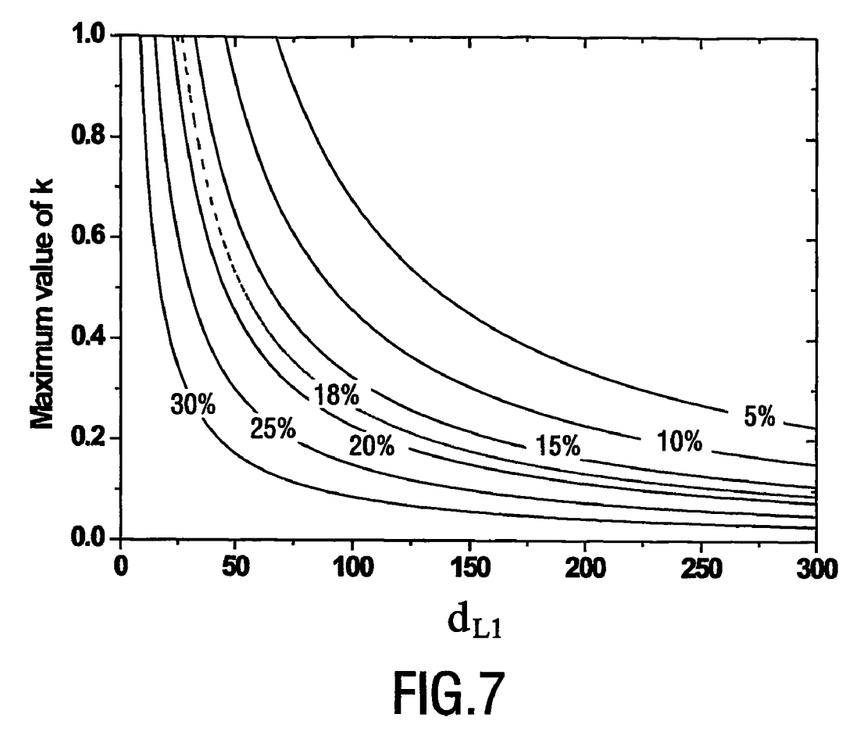
FIG. 7 shows the maximum value of allowed k versus $L_1$-recording layer thickness for various values of effective reflection in case of a laser wavelength within the DVD specification.

In FIG. 7 the maximum allowed k value for the recording layer of $L_1$ is shown as a function of the recording layer thickness $d_{L1}$ for various values of the $R_{min}$.

Figure 8:
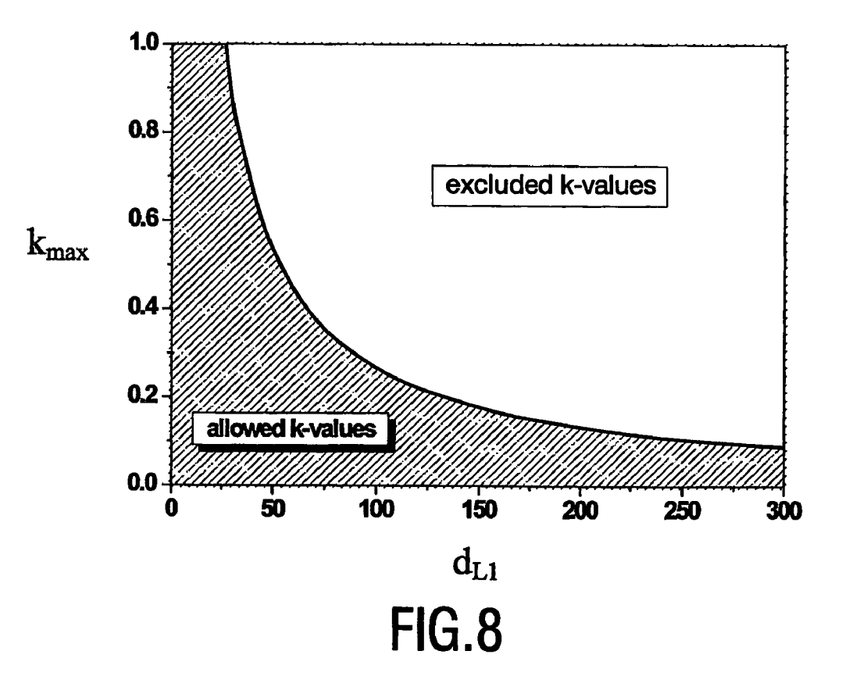
FIG. 8 shows the range of allowed k-values as a function of $L_1$-recording layer thickness for a dual-stack medium that meets the DVD specifications (laser wavelength 655 nm, Rmin=18%).

In FIG. 8 the special case where $R_{min}$=0.18 is drawn separately where it the area with allowed k-values has been hatched.

Figure 9:
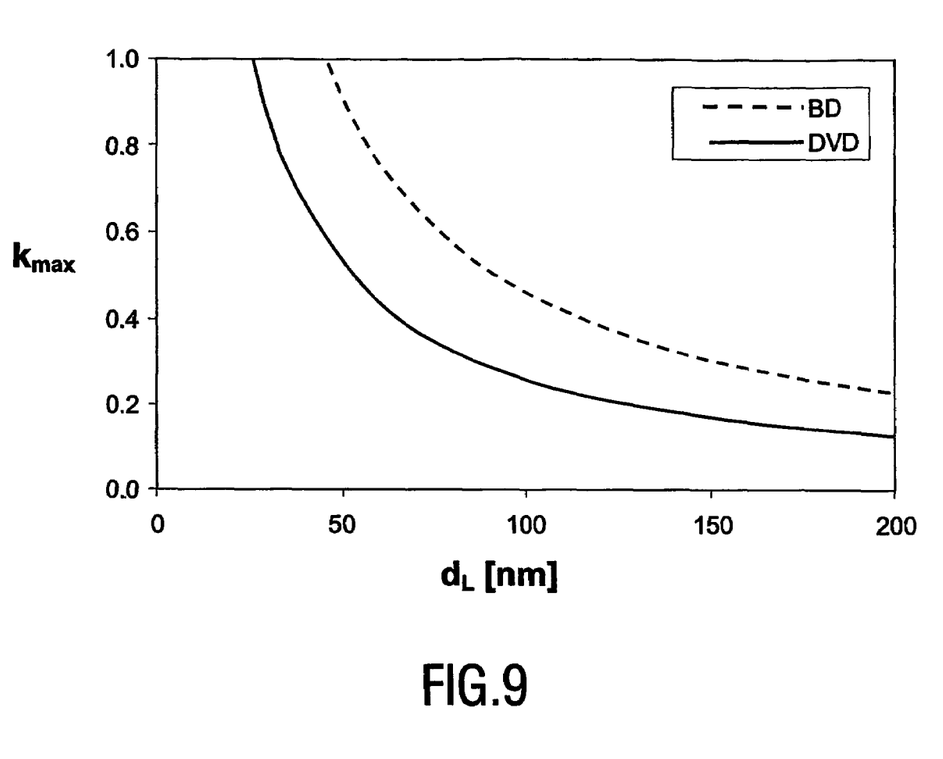
FIG. 9 shows the maximally allowed k-value in the case of a DVD-compatible (for R=18%) and a BD-compatible (for R=4%) dual-layer disc.

In FIG. 9 the same is done and the graph for BD has been added as a comparison.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The mere fact that certain measures are recited in mutually different dependent claims does not indicate that a combination of these measures cannot be used to advantage.

According to the invention a dual-stack optical data storage medium for recording using a focused radiation beam having a wavelength $\lambda$ is described. The beam enters through an entrance face of the medium during recording. The medium comprises at least one substrate with present on a side thereof a first recording stack named $L_0$, comprising a recordable type $L_0$ recording layer, said first recording stack $L_0$ having an optical reflection value $R_{L0}$ and an optical absorption value $A_{L0}$ at the wavelength $\lambda$, and a second recording stack named $L_1$ comprising a recordable type $L_1$ recording layer, said second recording stack $L_1$ having an optical reflection value $R_{L1}$ and an optical absorption value $A_{L1}$ at the wavelength $\lambda$, and a transparent spacer layer sandwiched between the recording stacks. By fulfilling the formula $A_{L1} \leq 1-R_{min}-\sqrt{(R_{min}/R_{L0})}$ in which formula $R_{min}$ is the minimum required effective optical reflection value for each recording stack full compatibility is achieved with a read only (ROM) version of the medium.

The invention claimed is:

1. A dual-stack optical data storage medium for recording using a focused radiation beam having a wavelength $\lambda$ and entering through an entrance face of the medium during recording, comprising:

at least one substrate with present on a side thereof:

a first recording stack named $L_0$, comprising a recordable type $L_0$ recording layer, said first recording stack $L_0$ having an optical reflection value $R_{L0}$ and an optical absorption value $A_{L0}$ at the wavelength $\lambda$, a second recording stack named $L_1$ comprising a recordable type $L_1$ recording layer, said second recording stack $L_1$ having an optical reflection value $R_{L1}$ and an optical absorption value $A_{L1}$ at the wavelength $\lambda$, said second recording stack being present closer to the entrance face than the first recording stack, a transparent spacer layer sandwiched between the recording stacks, said transparent spacer layer having a thickness substantially larger than the depth of focus of the focused radiation beam, wherein the first recording stack and the second recording stack are formed such that $A_{L1} \leq 1-R_{min}-\sqrt{(R_{min}/R_{L0})}$ in which formula $R_{min}$ is the minimum required effective optical reflection value for each recording stack for the medium to be compliant with a read-only version of the medium.

2. The dual-stack optical data storage medium according to claim 1, wherein $A_{L1} \leq A_{L0}$.

3. The dual-stack optical data storage medium according to claim 2, wherein $$1.5A_{L1} \leq A_{L0} \leq 2.5A_{L1}.$$

4. The dual-stack optical data storage medium according to claim 1, wherein the recordable type $L_1$ recording layer (6) has a complex refractive index $\tilde{n}_{L1\lambda}=n_{L1\lambda}-i*k_{L1\lambda}$ at the wavelength $\lambda$ and has a thickness $d_{L1}$ and the following formula is fulfilled:

$$k_{L1\lambda} \leq \{\lambda * ln[1/(R_{min}+\sqrt{(R_{min})})]\}/(4\pi * d_{L1}).$$

5. The dual-stack optical data storage medium according to claim 4, wherein the recordable type $L_0$ recording layer has a complex refractive index $\tilde{n}_{L0\lambda}=n_{L0\lambda}-i*k_{L0\lambda}$ at the wavelength $\lambda$ and has a thickness $d_{L0}$ and the following formula is fulfilled:

$$k_{L0\lambda} \leq \{\lambda * ln[1/(R_{min}+\sqrt{(R_{min})})]\}/(4\pi * d_{L0}).$$

6. The dual-stack optical data storage medium according to claim 5, wherein
$\lambda$ is substantially 655 nm, $R_{min}=0.18$.

7. The dual-stack optical data storage medium according to claim 5, wherein
$\lambda$ is substantially 405 nm, $R_{min}=0.04$.

8. The dual-stack optical data storage medium according to claim 5, wherein
$\lambda$ is substantially 405 nm, $R_{min}=0.12$.

9. Use of an optical data storage medium as claimed in any one of the preceding claims for dual stack recording with an effective optical reflectivity level of more than $R_{min}$ of both the first recording stack $L_0$ and the second recording stack $L_1$, $R_{min}$ being the minimum required reflectivity level.

10. The dual-stack optical data storage medium according to claim 1, wherein the medium is a DVD recordable dual stack medium, wherein the recordable type $L_0$ recording layer comprises an organic dye, with thickness of 80 nm, wherein the refractive index of the dye is 2.24−0.02i, wherein the recordable type $L_1$ recording layer comprises an azo dye, with thickness of 80 nm, wherein the refractive index of the dye is 2.24−0.02i, and wherein the at least one substrate has a thickness of 0.58 mm.

11. The dual-stack optical data storage medium according to claim 10, wherein $R_{min}=0.18$, the wavelength $\lambda=655$ nm and the medium is configured to be compatible with the DVD ROM standard.

12. The dual-stack optical data storage medium according to claim 1, wherein the medium is a Blue-ray recordable dual stack medium, wherein the recordable type $L_0$ recording layer comprises an organic dye, with thickness of 50 nm, wherein the refractive index of the dye is 2.4−0.04i, wherein the recordable type $L_1$ recording layer comprises an organic dye, with thickness of 50 nm, wherein the refractive index of the dye is 2.4−0.04i, and wherein the at least one substrate comprises a transparent UV curable resin, having a thickness of 0.075 mm.

13. The dual-stack optical data storage medium according to claim 10, wherein $R_{min}=0.12$, the wavelength $\lambda=405$ nm and the medium is configured to be compatible with the Blue-ray ROM standard.

* * * * *